United States Patent [19]

Ekman

[11] Patent Number: 4,742,850

[45] Date of Patent: May 10, 1988

[54] FEMALE COUPLING COMPONENT FORMING PART OF A QUICK COUPLING

[76] Inventor: Thure Ekman, Slalomvägen 12, 541 33 Skövde, Sweden

[21] Appl. No.: 838,856

[22] Filed: Mar. 12, 1986

[30] Foreign Application Priority Data

Mar. 13, 1985 [SE] Sweden ............................... 8501234

[51] Int. Cl.$^4$ ............................................. F16L 37/28
[52] U.S. Cl. ......................... 137/614.05; 137/614.03; 251/149.8; 251/339; 251/342
[58] Field of Search ...................... 137/614.04, 614.03, 137/614.05; 251/149.6, 149.8, 339, 342

[56] References Cited

U.S. PATENT DOCUMENTS

| | | | |
|---|---|---|---|
| 3,756,281 | 9/1973 | Gravert | 251/339 |
| 3,791,411 | 2/1974 | Boyeslcov et al. | 251/149.6 |
| 3,910,312 | 10/1975 | Weinhold | 137/614.03 |
| 4,269,389 | 5/1981 | Ekman | 251/149.6 |
| 4,327,770 | 5/1982 | Brown et al. | 251/149.8 |
| 4,366,836 | 1/1983 | Villari | 251/342 |
| 4,509,554 | 4/1985 | Failla | 137/614.08 |

Primary Examiner—A. Michael Chambers
Attorney, Agent, or Firm—Pollock, Vande Sande & Priddy

[57] ABSTRACT

In a female coupling component (1, 2) which forms part of a quick coupling there is present a unit (12) so arranged as to be capable of longitudinal displacement in the longitudinal sense of the female coupling component. The unit supports at its first end a first sealing component (14) which is capable of interacting with a seat (1b) in the female coupling component. At its second end the unit supports a second sealing component (15) which is capable of interacting with a sleeve (7) so arranged as to be capable of longitudinal displacement in the female coupling component. The unit comprises an elongated hub component and extending from it wing-shaped elements (25) by means of which the unit which is capable of longitudinal displacement is centered in the female coupling component and between which the fluid passageways lead into the female coupling component.

15 Claims, 2 Drawing Sheets

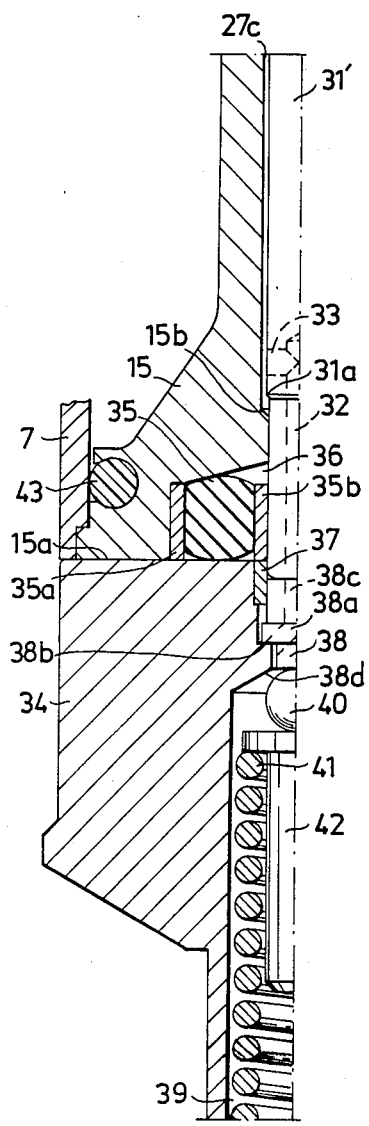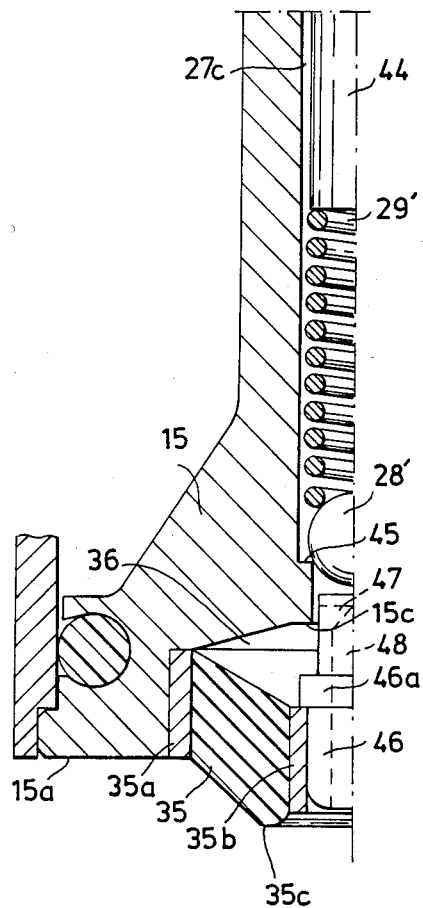

FEMALE COUPLING COMPONENT FORMING PART OF A QUICK COUPLING

TECHNICAL FIELD

The present invention relates to a female coupling component forming part of a quick coupling, which contains a unit capable of longitudinal displacement in the coupling component. The unit supports at its first end a first sealing component capable of interacting with a seat in the female coupling component and at its second end a second sealing component capable of interacting with a sleeve so arranged as to be capable of longitudinal displacement in the female coupling component.

BACKGROUND

Previously disclosed is the arrangement in such a way of a double valve arrangement in a female coupling component. The advantage of using a unit adapted for longitudinal displacement with two sealing components (valves) is that it is possible, with the female coupling component in its separated position, to achieve an extremely reliable seal against extremely high pressures (e.g. 30 MPa).

The use is proposed in the previously disclosed two-valve system of a sleeve-shaped unit provided at its sealing components at each external end with angled holes through which the fluid in the female coupling component is led from the outside of one of the sealing components, into the sleeve-shaped part of the unit and out from the sleeve-shaped component to the outside of the second sealing component.

DESCRIPTION OF THE PRESENT INVENTION

Technical Problem

It is difficult in the previously disclosed two-way valve system to achieve the necessary mechanical strength in the tube-shaped component. It may be advantages to provide female coupling components of this kind with one or more pressure eliminating devices by means of which a small quantity of fluid can be led from the pressure side of the female coupling component to the outside of the female coupling component in such a way that connection to a compatible male coupling component in the quick coupling is possible with comparatively small compressive force.

THE SOLUTION

The principal object of the present invention is to provide a female coupling component which solves the problem outlined above. The main novel feature of female coupling component unit consists of an elongated hub component and extending from it wing-shaped elements. The unit which is capable of longitudinal displacement is centered in the female coupling component, by means of these wing-shaped elements and between which the fluid passageway leads into the female coupling component.

Further embodiments of the present invention are concerned with the more detailed structure of the unit. It may be composed of three component parts, of which one intermediate component supports the wing-shaped elements. Attached to this intermediate component are two outer components, each of which supports one of the sealing components, for instance with the help of threads.

In a preferred embodiment of the present invention the wing-shaped elements are guided by their outer edges against an inner surface of the sleeve which is adapted for longitudinal displacement in the female coupling component. The wing-shaped elements support at their first ends parts which are capable of interacting with an internal stop surface in the female coupling component. These parts are acted upon by a cylindrical spring for the sleeve which is capable of longitudinal displacement.

The hub component or the intermediate and outer components are provided with a continuous transcurrent channel which extends between the end surfaces of the sealing components. Pressure elimination devices are arranged in this channel.

In one embodiment of the invention a small diverted quantity of fluid is passed from the female coupling component to the male coupling component, or vice versa. In another embodiment use is made of a rubber membrane at the end of the second sealing component. This rubber membrane exhibits a pin capable of interacting with a ball.

In another preferred embodiment of the invention use is made of guide balls which project above a guide surface capable of interacting with a commercially available coupling. Preferably a number of guide balls are used which are evenly distributed over the guide surface. Each guide gall is accommodated in a recess which is arranged in the transverse direction of the female coupling component. The recess is provided with an opening discharging at the guide surface which is of a smaller diameter than the guide ball. The guide ball is thus able to project with a spherical part above the guide surface. Each ball in each recess is locked by means of a retaining device, for example in the form of a screw. Each projecting spherical part of each ball is capable of interacting with an axial groove in the corresponding surface of the male coupling component, which exhibits a number of axial grooves corresponding to the number of guide balls.

Advantages

The present invention provides a quick coupling which is able to withstand extremely high fluid pressures at the same time, as the coupling can be executed with an optimum circuit cross-sectional area for the fluid. In addition, if so desired, one or both of the coupling components of the quick coupling may be provided with one or more pressure eliminating devices which facilitate connection of the coupling components. The male coupling component can be executed with a corresponding male coupling component in such a way as to provide leak-free replacement.

The invention also permits a convenient construction made up of comparatively few and easily combined component parts.

BRIEF DESCRIPTION OF DRAWINGS

A preferred embodiment which exhibits the significant characteristic features of the invention is now described below with simultaneous to the accompanying drawings, in which:

FIG. 3 shows in longitudinal section parts of the unit in accordance with FIG. 2 and parts of a male coupling component which is capable of being connected to the female coupling component in accordance with FIG. 1; and FIG. 4 shows in longitudinal section a sealing component forming part of the unit in accordance with FIG. 2 with its associated pressure elimination device.

BEST MODE OF CARRYING OUT THE INVENTION

Figures 1, 2:
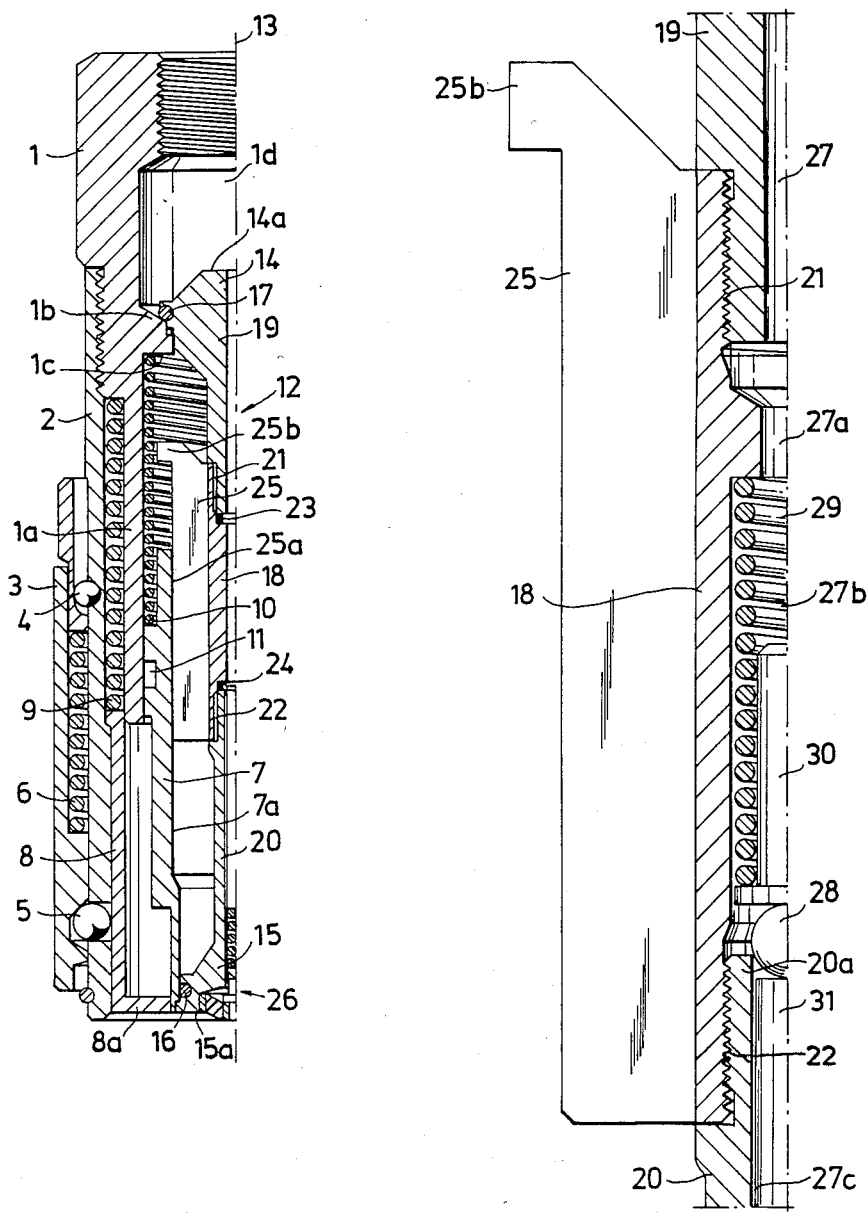
FIG. 1 shows in longitudinal section one half of a female coupling component.
FIG. 2 shows in lontiguidnal section one half of a unit present in the female coupling component in accordance with FIG. 1 which is so arranged for longitudinal displacement in the female coupling component, with the design in accordance with FIG. 2 differing from the design in accordance with FIG. 1.

FIG. 1 shows a section through one half of a female coupling component which forms part of a high-quality quick coupling designed to be made primarily in metal, for example automatic steel. The fundamental principles of the female coupling component have been previously described. The female coupling component exhibits a case 1 and an outer sleeve 2 securely attached to it. A locking sleeve 3 of a known type is arranged on the outer sleeve. Balls 4, 5 and a spring 6 are included in the locking function.

The female coupling component comprises an inner sleeve or sealing sleeve 7 which is capable of longitudinal displacement. Protective sleeve 8 is provided with a protective flange 8a, which is intended to prevent the penetration of foreign particles into the coupling component when this is in a non-actuated position. The protective sleeve is caused to move to its outer position by cylindrical spring 9 in accordance with FIG. 1. Inner sleeve 7 is caused to move to its sealing position by cylindrical spring 10 in accordance with FIG. 1.

Case 1 is provided with a hollow, cylindrical-shape part 1a, on the outside of which the spring 9 is arranged. Sleeve 7 runs on the inside of the part 1a, where spring 10 is also arranged. Sleeve 7 is provided with a space 11 for seals, which are not specifically shown here and which seal the outside of the sleeve against the inner surface of the part 1a.

Arranged centrally in the female coupling component is unit 12 which is capable of longitudinal displacement in the longitudinal direction of the unit. The longitudinal axis of unit 12 coincides with the longitudinal axis 13 of the female coupling component. The unit exhibits at its first end a first sealing component 14 and at its second end a second sealing component 15. The first sealing component 14 interacts with a fixed seat 1b on the case. The second sealing component 15 interacts with the sealing sleeve 7 in order to provide a sealing function, as will be appreciated from FIG. 1. The second sealing component exhibits a sealing device 16 which is not illustrated specifically here. The sealing device on the first sealing component is indicated by the reference designation 17.

Unit 12 may be regarded as being made up of three components. A first component consists of an intermediate component 18 and two outer components 19 and 20. Outer component 19 supports sealing component 14, and outer component 20 supports sealing component 15. Each outer component is capable of being attached to the intermediate component by means of threads 21 and 22. In one embodiment the components 18, 19 and 20 are sealed one against the other by means of seals 23, 24 of a known type. Components 18, 19 and 20 constitute a hub component which support sealing components 14 and 15 at their respective ends.

The intermediate component/hub component is provided with projecting, wing-shaped elements. These center unit 12 in the female coupling component and are three or more in number. Elements 25 run along the entire longitudinal extent of the intermediate component or parts of the longitudinal extent of the hub component. In the embodiment illustrated edge surfaces 25a of elements 25 run along inner surface 7a of inner sleeve 7. The disc-shaped elements are also provided with stop devices 25b which interact with internal stop surface 1c on case 1. The stop devices face towards the inside of spring 10.

The unit is provided with a central, transcurrent channel which is described in more detail below and which extends between end surfaces 14a and 15a of sealing components 14 and 15. The unit is also provided with one or more pressure eliminating devices 26, by means of which fluid can pass from space 1d and down towards the other end of the unit, or vice versa.

Illustrated in FIG. 2 is construction of the intermediate component 18 and the attachment of outer components 19 and 20 on an enlarged scale. These components constitute a transcurrent channel which is composed of channel components 27, 27a, 27b and 27c. Intermediate component 18 is cylindrical and is provided at its respective ends with an internal thread, into which each outer component can be screwed by means of a corresponding thread. End component 20a on the second outer component 20 constitutes a seat for a ball 28 which plays a part in the pressure elimination function. This ball is caused to move towards its seat by a cylindrical spring 29 arranged in channel component 27b. Actuation takes place via a force transmission device 30, the purpose of which is to apply an appropriate effect to ball 28 causing it to move towards seat 20a. Ball 28 is capable of being raised against the effect of spring 29 by means of a rod-shaped device 31, the prolongation of which is indicated in FIG. 3 by 31'.

FIG. 3 also shows that the rod-shaped device is provided on those of its component parts which extend into the sealing component 15 on the one hand with a central recess 32, and on the other hand with a recess 33 which connects channel component 27c with recess 32. Rod 31 is also provided with a heel stop 31a for interacting with a corresponding stop surface 15b in the second sealing component. Ball 28 and rod 31 are shown in FIG. 2 in an unactuated position. Rod 31' in FIG. 3 is shown in an actuated position. This actuated position is achieved with the help of a central component 34 in the male coupling component which can be connected to the female coupling component. The nature of the connection between these components is illustrated in its initial phase, with only the pressure elimination function between the components being shown.

Rod-shaped component 31, 31' projects beyond end surface 15a of sealing component 15. The rod extends at the end surface through a central hole in rubber bush 35 which is arranged in hole 36 in sealing component 15. The rubber bush exhibits an outer ring 35a, preferably made of metal, via which the rubber bush is secured, for example by pressing, in the sealing component 15. The rubber bush also exhibits an inner ring 35b, preferably made of metal, which forms a hole through which rod-shaped component 31, 31' can extend out above end surface 15a. Male component 34 is provided with a bush 37, which can be pressed or screwed into a hole in male component 34. The bush serves as a retaining device for a pin 38 arranged in the male component which is provided with a flange 38a, which is capable of interacting with an end surface of bush 37. Pin 38 is capable of longitudinal displacement between two end positions, one of which is formed by bush 37 and the other by an internal stop surface 38b.

The male component is also provided with an internal channel 39 which is so designed as to form a seat 38c for a ball 40 which is pressed against the seat by a cylindrical spring 41, which acts upon the ball via a force transmission device 42.

As the end surfaces of component 34 and the component 15 are brought together the rod-shaped device will interact with pin 38 in such a way that balls 28 and 40 will be raised from their respective seats. It is then possible for fluid to pass from space 1d (FIG. 1), channel 15 components 27, 27a, 27b, 27c and bores 33 and 32. Pin 38 is also provided with a bore 38c through which the fluid can pass further into male coupling component 34 as far as hole 39. The pressure relief achieved in this way permits the continuous connection of the coupling components at relatively small connection forces. The channel is also opened in the opposite direction if the pressure is higher in the male component than in the female component. The sealing device on component 15 is indicated by reference designation 43 in FIG. 3.

FIG. 4 shows an alternative embodiment of the pressure elimination function. In this case ball 28 (FIG. 2) has been moved down into sealing component 15; see 28'. A supporting component 44 arranged centrally in hole 27c is present in this case for cylindrical spring 29' which causes ball 28' to move against its seat 45. Rod-shaped component 31, 31' (see FIGS. 2 and 3) has been replaced in this case by a pin-shaped device 46 so arranged as to be capable of displacement in ring 35 on rubber membrane 35. Pin 46 is provided with internal holes 47, 48 via which the fluid can be passed when pin 46 is forced in by the male component and raises ball 28' against the effect of its spring 29'. Fluid can thus pass from hole 27c towards the end surface via holes 47 and 48. Pin 46a has two end positions which are determined by inner ring 35b and stop surface 15c on component 15. When the male component presses against sealing component 15, membrane 35 is forced into hole 36 so that its outer surface 35c will largely coincide with end surface 15c of component 15. With membrane 35 in this depressed position pin 46 will project beyond end surface 35c and is able to interact with pin 38c (see FIG. 3) in accordance with the above. It is thus possible also in this case for additional fluid to pass between the male and female components.

FIG. 1 shows the female coupling component in a fully closed position. In the case of a connection with a corresponding male coupling component sleeves 7 and 8 are displaced longitudinally against the effect of their respective springs. In addition unit 12 is displaced longitudinally from the position shown in FIG. 1 towards the stop surface 1c. This displacement is achieved with the help of component 34 shown in FIG. 3. The sealing component is caused by the displacement of the unit to be raised from its sealing position in accordance with FIG. 1 and into its fully open position in which fluid is able to flow from space 1d and down between wings 25 and onwards, or in the opposite direction. As sleeve 7 is displaced longitudinally, the seal between sealing component 15 and sleeve 7 is released, resulting in the fluid passageway opening in this area, too, and being able to lead into the male component in a previously disclosed fashion. The fluid passageway thus runs outside component 34 (FIG. 3). Reference is made in this respect to the arrangement in accordance with Swedish Patent No. 7506846-0. The unit which is capable of longitudinal displacement is positioned in such a way that it is able to execute at least small rotational movements about its longitudinal axis, which is also true of sleeve 7.

The invention is not restricted to the embodiment illustrated above by way of example, but may undergo modifications within the context of the following patent claims and the idea of invention.

I claim:

1. A female coupling member of a quick coupling device comprising
   an inner member and an outer member coupled to said inner member, said inner member having external and internal walls, said internal walls defining a hollow cavity, said internal wall of said inner member including an outwardly extending projection portion including a seat portion;
   a unit member disposed within said hollow cavity including an elongated hub component, and at least two wing-shaped elements extending from said hub component, said unit member arranged for longitudinal displacement within said cavity;
   and a sealing sleeve disposed in said cavity between said internal walls and said unit member,
   said unit member supporting at its first end a first sealing means and at its second end a second sealing means, said first sealing means interacting with said seat portion of said inner member and outer member and said second sealing means interacting with a seat portion on said sealing sleeve, said at least two wing-shaped elements facilitating centering of said unit member within said cavity and constituting a passageway to lead fluid to said female coupling member, said hub component including a channel extending through the entire length of said hub component and discharging at end surfaces of said first and second sealing means, and at least one pressure elimination means arranged within said channel a small quantity of fluid to be passed to or from a space outside said first sealing member when said female coupling member is connected to a male coupling member.

2. A female coupling member according to claim 1 wherein said wing-shaped elements are arranged to provide said unit member with a maximum opening position by interacting with an internal stop surface on said projection portion.

3. A female coupling member according to claim 2 wherein said unit member comprises
   at least three components adapted to be assembled together,
   an intermediate component supporting said wing-shaped elements, and first and second outer components, said first outer component supporting said first sealing means, said second outer component supporting said second sealing means, said intermediate component having first and second ends adapted for screwing thereon said first and second outer components thereon.

4. A female coupling member according to claim 3 wherein said wing-shaped elements are adapted to guide along an inner surface of said sealing sleeve.

5. A female coupling member according to claim 4 wherein said wing-shaped elements extend substantially along said intermediate component, wherein said sealing sleeve is provided with a spring, and wherein parts of said unit member adapted to interact with said projection portion on said inner member of said female member are subject to the resistance of said spring.

6. A female coupling member according to claim 1 wherein parts of said pressure eliminating means are arranged in said first and second sealing means.

7. A female coupling member according to claim 1 wherein said channel and said pressure elimination means are arranged to allow fluid passage to a male coupling member connectable and disconnectable with the female coupling member.

8. A combined holding and sealing device in an actuation device included in a pressure elimination means positioned in a first coupling part, of a coupling device, said actuation device being actuable by a second coupling part, said combined holding and sealing device being spaced apart from said pressure elimination means, said holding and sealing device comprising:
   substantially rigid outer and inner portions and a flexible portion connected therebetween, said flexible portion capable of being distorted to follow the movement of said inner portion holding at all times said actuation device between activated and deactivated positions said flexible portion being at the same time secured to said outer portion occupying fixed position with respect to said actuation device, thereby said sealing and holding device is adapted to seal against medium leakage between two opposite surfaces of said first and second coupling parts when the actuation device moves between the deactivated and activated positions of the pressure elimination means.

9. A device according to claim 8, wherein said flexible portion (35) is adapted to enter into a cavity (36) positioned in said first coupling part when said surfaces are moved towards each other.

10. A device according to claim 9, having first and second bush members (35a, 35b) constituting said inner and outer portions disposed on two opposite sides of said flexible portion (35) and interactable with an inner wall of said first coupling part (15) and said actuation member (46), respectively.

11. A device according to claim 10, wherein said second bush member (35b) is axially displaceable together with said flexible portion (35) and adapted to interact with a flange (46a) of the actuation member.

12. A device according to claim 8 wherein both coupling parts are provided with a pressure elimination means in order to obtain medium flow between the coupling parts via said pressure elimination means during the coupling procedure of said coupling parts.

13. A device according to claim 8 wherein said flexible portion 35 holds an actuation member above a first surface (15a) of said first coupling part (15) in a first position of said actuation member (46).

14. A device according to claim 8, wherein an outer surface of said sealing portion is adapted to be in plane with said first surface of the first coupling part.

15. A device according to claim 8 wherein said flexible portion is a rubber membrane.

* * * * *